(12) United States Patent
Jarjour et al.

(10) Patent No.: US 12,499,571 B2
(45) Date of Patent: Dec. 16, 2025

(54) SYSTEM AND METHOD FOR SELECTING A SPORTING EQUIPMENT

(71) Applicant: MyVeloFit Inc., Ottawa (CA)

(72) Inventors: William Jesse Carim Jarjour, Ottawa (CA); Jérôme Bertrand Nicolas Cornet, Ottawa (CA)

(73) Assignee: MyVeloFit Inc., Ottawa (CA)

( * ) Notice: Subject to any disclaimer, the term of this patent is extended or adjusted under 35 U.S.C. 154(b) by 354 days.

(21) Appl. No.: 18/075,800

(22) Filed: Dec. 6, 2022

(65) Prior Publication Data

US 2023/0177718 A1 Jun. 8, 2023

Related U.S. Application Data

(60) Provisional application No. 63/286,341, filed on Dec. 6, 2021.

(51) Int. Cl.
G06K 9/00 (2022.01)
G06T 7/10 (2017.01)
G06T 7/70 (2017.01)

(52) U.S. Cl.
CPC ............... *G06T 7/70* (2017.01); *G06T 7/10* (2017.01); *G06T 2207/20021* (2013.01); *G06T 2207/30196* (2013.01)

(58) Field of Classification Search
CPC .................... A63B 24/0062; G06T 7/80
See application file for complete search history.

(56) References Cited

U.S. PATENT DOCUMENTS

| 9,381,417 B2* | 7/2016 | Inoue ............... A63B 71/06 |
| 10,704,890 B2* | 7/2020 | Ho ..................... B62J 50/22 |
| 2013/0211774 A1* | 8/2013 | Bentley ............... G01P 13/00 |
| | | 702/145 |
| 2018/0018779 A1* | 1/2018 | Lu ..................... A61B 5/1128 |

\* cited by examiner

*Primary Examiner* — Hadi Akhavannik
(74) *Attorney, Agent, or Firm* — Nyemaster Goode P.C.

(57) ABSTRACT

Systems and methods for determining a proper fit of a sporting equipment are disclosed. The method includes receiving, at a processor, from a camera video or image data of a user comprising a series of movements of the user; detecting, at the processor, coordinates of a plurality of joints of the user from the video or image data; generating, at the processor, a calibrated body segment length of the user; assessing, at the processor, mobility of the user based on the video or image data; generating, at the processor, a model of the user using the calibrated segment length; and selecting, at the processor, the sporting equipment based on the model.

18 Claims, 4 Drawing Sheets

SYSTEM AND METHOD FOR SELECTING A SPORTING EQUIPMENT

CROSS-REFERENCE TO RELATED APPLICATION

The present application claims priority to and the benefit of U.S. provisional application No. 63/286,341, entitled "SYSTEM AND METHOD FOR DETERMINING THE PROPER FIT AND SIZING OF A SPORTING EQUIPMENT", filed on Dec. 6, 2021, the content of which is incorporated in this disclosure in its entirety.

FIELD

The present disclosure generally pertains to sports equipment, in particular to the system and method for determining a proper fit of a sporting equipment.

BACKGROUND

Determining the correct size of a sporting equipment, such as a bike frame, that will be comfortable for a user to use is a difficult task to perform remotely.

For example, many bike manufacturers rely on formulas (based on rider height, inseam, or shin/thigh length) to determine a frame size that matches a user.

While this gives grossly correct results, this process is designed around average body shapes and does not work well for users with out-of-the-norm body segment ratios. As an example, two users with the same height, leg measurements but different arm lengths will lean forward differently on the same frame.

Also, this type of sizing does not take into account mobility restrictions of the cyclist, for example, which may not be able to achieve some riding positions (back/neck issues can make it difficult to achieve an aerodynamic time trial position).

SUMMARY

In some embodiments, the system and method of the present disclosure are configured to determine the user's body segment length from video frames or images, and size calibration, and to generate a model of the user for the purpose of selecting sporting equipment fitting the model, therefore the user.

In some embodiments, the system and method are configured to take into account the user's mobility to select equipment size for the user. The model takes into account physical limitations of the user in terms of flexibility.

In some embodiments, the system and method are configured to allow the user to preview how a sporting equipment, for example bike frame, would fit the user's body shape or mobility.

In an aspect, there is provided a method for selecting a sporting equipment, comprising receiving, at a processor, from a camera video or image data of a user comprising a series of movements of the user; detecting, at the processor, coordinates of a plurality of joints of the user from the video or image data; generating, at the processor, a calibrated body segment length of the user; assessing, at the processor, mobility of the user based on the video or image data; generating, at the processor, a model of the user using the calibrated segment length; and selecting, at the processor, the sporting equipment based on the model.

In another aspect, the method further comprises setting, at the processor, coordinates of the plurality of joints.

In another aspect, the calibrated body segment length is determined using a calibration factor, measured in pixels per centimeter.

In another aspect, the calibration factor is equal to (leg_pixel+back_pixel+upper_arm_pixel)/height of the user_in centimeters.

In another aspect, the calibration factor is equal to diagonal measured in camera pixels/diagonal of the marker measured in cm using a market.

In another aspect, the calibrated body segment length is generated by dividing the dimension of the segment extracted from video or image pixels by the calibration factor.

In another aspect, the method further comprises performing, at the processor, a mobility assessment of the user.

In another aspect, the model is a 2-dimensional stick figure or a 3-dimensional model.

In another aspect, the method further comprises modifying, at the processor, the mobility assessment and determining an optimal body position for the sporting equipment.

In another aspect, selecting the sporting equipment comprising selecting equipment sizes compatible with the user's body shape, mobility, and desired riding style.

In another aspect, the method further comprises displaying, by the processor, a resulting fit of the sporting equipment.

In another aspect, there is provided a system for selecting a sporting equipment, comprising: a processor configured for: receiving, at a processor, from a camera video or image data of a user comprising a series of movements of the user; detecting, at the processor, coordinates of a plurality of joints of the user from the video or image data; generating, at the processor, a calibrated body segment length of the user; assessing, at the processor, mobility of the user base on the video or image data; generating, at the processor, a model of the user using the calibrated segment length; and selecting, at the processor, the sporting equipment based on the model.

In another aspect, the processor is further configured for setting, at the processor, coordinates of the plurality of joints.

In another aspect, the calibrated body segment length is determined using a calibration factor.

In another aspect, the calibration factor is equal to (leg_pixel+back_pixel+upper_arm_pixel)/height of the user_in centimeters.

In another aspect, the calibration factor is equal to diagonal measured in camera pixels/diagonal of the marker measured in centimeters using a marker.

In another aspect, the calibrated body segment length is generated by dividing the dimension of the segment extracted from video or image pixels by the calibration factor.

In another aspect, the processor is further configured for performing, at the processor, a mobility assessment of the user.

In another aspect, the model is a 2-dimensional stick figure or a 3-dimensional model.

In another aspect, the processor is further configured for modifying, at the processor, the mobility assessment and determining an optimal body position for the sporting equipment.

BRIEF DESCRIPTION OF THE DRAWINGS

Reference will now be made, by way of example, to the accompanying drawings, which show example embodiments of the present application.

DETAILED DESCRIPTION

The disclosure determines the proper fit of a sporting equipment including the appropriate equipment size, such as a bike frame, accessories, based on a user's body shape and joint mobility.

While the examples are cycling specific, the system and method are configured to determine the proper fit of a sporting equipment in any field where equipment is meant to be used by a user and match their size or mobility. This includes sports like cycling, where frame size matters, but can be applied to any other field where equipment is used, including hockey or skiing.

The system and method are configured to determine the appropriate equipment size by building a model of the user from a calibrated video and fitting this model to a library of riding positions and available equipment. The library of available equipment can also be augmented by measurements extracted from a calibrated video of a real life piece of equipment.

Figure 1:
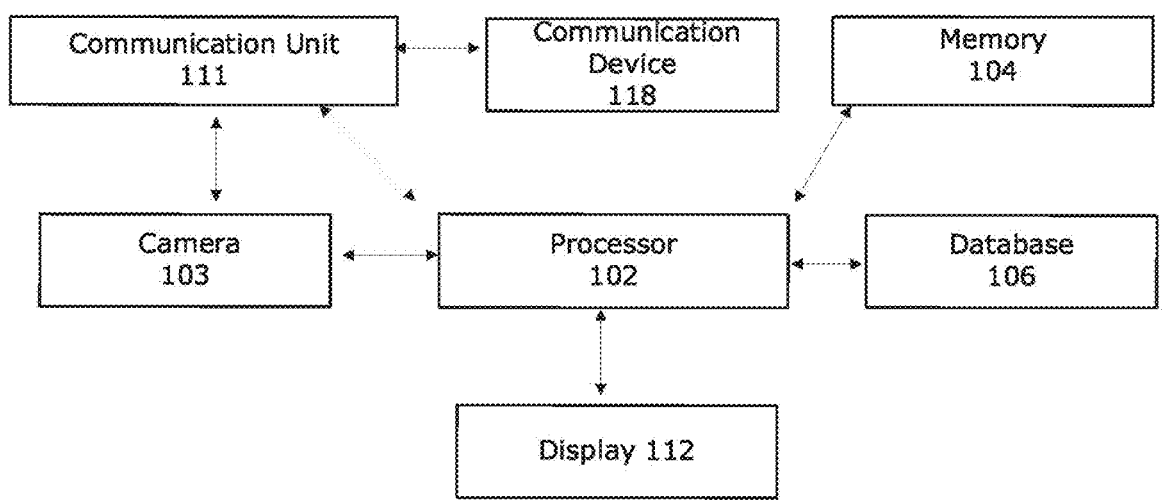
FIG. 1 is an exemplary diagram of a system, according to an embodiment of the present application.

FIG. 1 illustrates an example of a system 100 the present disclosure. The system 100 may include a computer or a server. The system 100 is configured to select a sporting equipment that properly fits a user. In the example of FIG. 1, the system 100 includes a processor 102, one or more memories 104, one or more databases or storage units 106, and communication unit 111. Although FIG. 1 shows a single instance of each component, there may be multiple instances of each component in the system 100.

The processor 102 is configured to implement the method 200 to be described below in greater detail. The processor 102 may be a central processing unit (CPU), a microprocessor, an application-specific integrated circuit (ASIC), a field-programmable gate array (FPGA), dedicated logic circuitry, or combinations thereof.

The processor 102 is configured to receive video and/or image data from a camera 103. The camera 103 is configured to generate video data or image data of a user or a sporting equipment. The camera 103 may be local to the processor 102 in a same computer or server, or remote from the processor 102. When the camera 103 is remote from the processor 102, the one or more videos or image data may be transmitted, via one or more communication networks, from the camera 103 to the processor 102 via the communication unit 111 of the system 100. The camera 103 may also be a camera of a communication device 118, such as a smart phone, a tablet, or a computer.

The memory 104 is configured to store instructions, codes, or statements, which when executed by the processor 102, cause the processor 102 to perform predetermined functions, such as surface fitting, and waypoints of a part, and method 200. The memory 104 may include a volatile or non-volatile memory (e.g., a flash memory, a random access memory (RAM), and/or a read-only memory (ROM)). The non-transitory memory(ies) 104 may store instructions for execution by the processor 102, such as to carry out the present disclosure. The memory(ies) 104 may include other software instructions, such as for implementing an operating system and other applications/functions. In some examples, one or more data sets and/or module(s) may be provided by an external memory (e.g., an external drive in wired or wireless communication with the system 100) or may be provided by a transitory or non-transitory computer or processor-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In some embodiments, the memory 104 may store data used by the processor 102 to implement the methods and operations described herein, for example, point cloud or mesh data of a part surface, parameters of waypoints, user input criteria including RMSE, coefficients for characterizing the surface of a part, and force vectors, and/or track width vectors.

The database or storage unit 106 is configured to store data for a relevant longer period. The database 106 may include a mass storage unit such as a solid state drive, a hard disk drive, a magnetic disk drive, and/or an optical disk drive.

A user may manually configure or control the system 100 via the I/O interface 112, such as a display, a touch screen, a key board or a mouse. The I/O interface 112 may also output operation information of the system 100, for example by messages, sounds or visual signals on a display screen of the system 100.

In some examples, the system 100 may also include a communication unit 111 for communicating with the camera 103 or the communication device 118.

Figure 2:
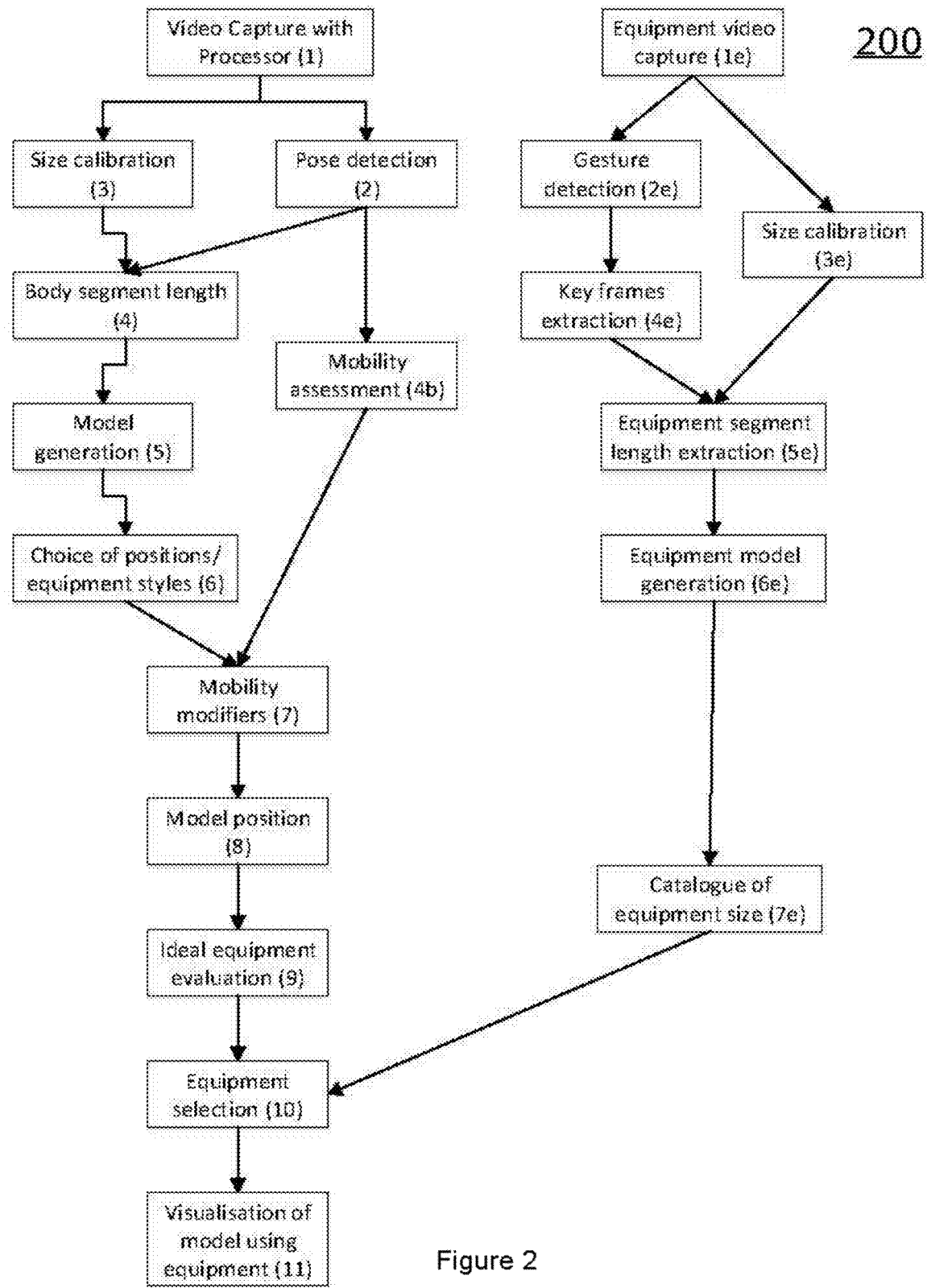
FIG. 2 illustrates an exemplary method for determining the proper fit of a sport equipment for a user.

The system 100 may be configured to use a method 200 illustrated in FIG. 2 to select a sporting equipment. In method 200 at step 1, the processor 102 is configured to receive video data or image data of a user from the camera 103. The video or image data include videos or images.

At step 2, the processor 102 is configured to detect pose of the user based on the received vide or image data and the sporting equipment to be selected, for example, in each image or video frame. The joints include those involved in the using the sporting equipment. For cycling, the joints include: shoulders, elbows, hips, knees and ankles.

For example, the processor 102 may be configured to a neural network that has been trained on a large corpus of video or image files annotated with joint positions of the sporting equipment. Different sporting equipment may involve different joints. Examples of the neural networks include: MoveNet, BlazePose, PoseNet, AlphaPose, OpenPose, and more.

Based on the joints identified, the processor 102 is configured to set coordinates of the joints, for example, using the neural network.

At step 3, the processor 102 is configured to calibrate the size of the body segments. The real world size of the body segments of the user may not be the same as the size indicated in pixels of the video frames and images, and need to be calibrated. For example, the processor 102 is configures to determine a ratio between the size of each pixel of the video frames or images and the real world size to generate a calibration factor. Depending on the level of precision needed, the processor 102 may generate the calibration factor by various methods.

In an example, especially if a greater accuracy is needed, a calibrated marker can be provided by the user in the video frames or images. For example, the user may hold the marker by a hand or display the marker in other manners. The processor 102 is configured to determine a scaling factor based on the marker. The calibrated marker may be an off-the-shelf AR marker, or 2-D barcode, that is printed with a known dimension, for example 10 cm. The processor 102 may use the marker to generate a calibration factor based on the distance between two diagonally opposite corners of the marker: calibration factor=diagonal measured in camera pixels/diagonal of the marker measured in cm. In this example, the marker is used rather than the user's height to calibrate the screen resolution of the communication device 118. The calibration factor is based on the size of the marker. So if the marker is, for example, 10 cm and measures 10 pixels diagonally then it can be assumed that the screen resolution of the communication unit 111 is 1 pixel per cm. Screens may have different resolutions at different areas of the screen, which may create a small error margin. The error can be overcome by placing the marker in different spots on the screen to calibrate the precise screen resolution in all areas of the screen.

In another example, a user can manually enter the height of the user via a communication device 118. The communication device 118 may transmit the input height to the communication unit 111 of the system 100. After receiving the height data from the communication unit 111, the processor 102 may apply a formula to recover approximate segment lengths of the user. For example, if there is no marker, the calibration factor in pixels per cm=(leg_pixel+back_pixel+upper_arm_pixel)/height_in cm, where height is used in lieu of the marker. The processor 102 may then determine a calibrated segment height based on the number of pixels and the calibration factor.

Using the coordinates extracted during the pose detection step 2 and the size calibration at step 3, at step 4, the processor 102 can extract the user's real life body segment lengths.

Based on the coordinates of the joints, at step 4, the processor 102 is configured to extract the dimension of body segments, such as legs, arms, back, between the joints based on pixels in the video frames or images. For example, the processor 102 may be configured to use a geometric computation of the distance between two points of the coordinates.

At step 4, the processor 102 can generate a calibrated, real-life body segment length of the user by dividing the dimension of the segment extracted from video or image pixels by the calibration factor generated at step 3.

At step 4b, the processor 102 is configured to perform a mobility assessment of the user. The video or image data received at step 1 is composed of a series of movements to illustrate the range of motion of the joints, for example, toe touch, knee raise, etc. For example, the processor 102 is configured to perform a mobility assessment by measuring the range of motion of the joints determined at step 2 throughout the video frames or images. The processor 102 can determine the angles formed in the video or image coordinate system by the body segments for each position. For example, the processor 102 can measure the minimum angle achieved between the thigh segment and back segment when the user is trying to touch the floor; a user who can achieve only a 90° angle has low mobility, but a user who can achieve a 45° or lower angle has a high mobility. The user may also manually assess mobility and transmit the mobility assessment to the processor 102 via the communication device 118.

From the calibrated body segment lengths determined during step 4, at step 5, the processor 102 is configured to generate a model of the user using the calibrated real life segment length of the user. The model can be a 2-dimensional stick figure showing the rider from the side profile or a 3-dimensional model that includes the body segments of the user. The model reflects the proportion of the segment lengths of the user calibrated at step 4.

At step 6, the processor 102 is configured to receive selection of positions or equipment styles from the user via the communication device 118. The input from the communication device 118 may include the user's preferred exercising style and type of equipment. For example, the user input may include preferred riding style, road bike, mountain bike, triathlon, or spin bike from a database 106, which may be stored in a memory or storage unit.

At step 7, the processor 102 may use the selection received from the communication device 118 at step 6 and the mobility assessment at step 4b, the processor 102 may modify mobility assessment and determine an optimal body position for the equipment selected and the assessed mobility. The optimum body position is described in terms of relative joint angles and is independent of body segment size. For example, to determine the optimal body position, the user's mobility is determined and then entered into the processor 102 to generate a matrix of optimal body positions based on the level of mobility of the user.

Using the relative joint angles from the optimal body position of step 7, at step 8, the processor 102 may apply the model generated at step 5 to the optimal position at step 8 using a mechanical joint simulator to generate a model position. The mechanical joint simulator, through the processor 102, virtually poses the user into the potential positions available on each piece of equipment and then quantifies a potential position to identify whether it falls within the optimal body position determined at step 7.

At step 9, the processor 102 evaluates optimal equipment for the user. The processor 102 may evaluate output position of the model to extract measurements of the user such as the distance between the foot and hip as well as hip and wrists and foot and wrists. Based on the measurements, the processor 102 evaluates optimal equipment that may fit for the user.

For example, the distance between pedal of a bike and wrist of the user is a determinant of a frame size whose main measurements are stack and reach.

At step 10, the processor 102 is configured to select catalogue of equipment size down to the sizes that are compatible with the user's body shape, mobility, and desired riding style. The processor 102 may generate the catalogue from the known dimensions of the available equipment. For example, based on equipment manufacturer specifications, or based on a specific equipment based on equipment video capture at step 1e to be discussed below.

At step 11, the processor 102 is configured to allow the user to visualize what the resulting fit would be given their body shape, mobility, and selected equipment on the communication device 111. Given the discrete nature of bike frame sizes, for example, the processor 102 may also recommend how the adjustable parts can be set given the user. For example, a specific choice of frame may require a higher handlebar height.

The order of steps 1-11 may be varied.

The processor 102 is also configured to add new equipment to a catalogue of equipment size for equipment selection at step 10. For example, if the user wants to visualize the fit on a specific bike that is not in the catalogue (for example purchasing a used bike from a seller), the seller can also add the equipment to the catalogue by either entering the dimensions if they are known, or use a video-based equipment measurement described hereafter.

At step 1e, the camera 103 may take one or more videos or images of the equipment with a calibrated marker and the equipment. The seller may move the calibrated marker until it touches specific parts of the equipment in a sequence, then making a specific gesture or signal when they have done so. For example, moving the marker around the frame at the three points: top of seat tube, bottom bracket, top of steer tube; for each one of these points, when the bottom left corner of the marker is placed besides the corresponding point, the seller holding the marker makes a 'thumbs up' gesture to record the location of the target component. The communication device 118 may transmit the videos and images to the processor 102 for processing.

At step 1e, the camera 103 and the equipment remain static for the duration of the videos or images in order for the distance between key points of the equipment to be comparable, since they are computed from different video frames or images. If the camera 103 and the equipment are not static for the duration of the videos or images, the processor 102 may use a video stabilization method to ensure that the equipment remains static relative to the video frames or images for the duration of the video and images.

At step 2e, the processor 102 is configured to detect the signal of ending the calibrated marker. For the example, the processor 102 may use an off the shelf neural network trained on the appropriate gestures (such as MediaPipe Hands for hand gestures tracking) processes the video and detects at which points in the video the user makes the expected gesture or signal, such as thumbs up.

At step 3e, the processor 102 may calibrate the size of the equipment, for example, by determining the ratio between video pixel and real world measurements of the equipment using the known dimension of the marker by dividing the dimension of the diagonal in pixels in the video by the known dimension of the marker in centimeters, as described above.

Using the video frames or images at which the gestures are detected at step 2e, the processor 102 determines the coordinates of the bottom left corner of the marker in the video frames or images for each of these video frames and images at step 4e. At step 4e, the processor 102 in combination with the sequence of the marker at step 1e, extracts the dimensional values, such as lengths, of the equipment, such as seat tube height, stack and reach for a bike.

At step 5e, the processor 102 may combine the ratio generated at step 3e and the distances of key frames extracted at step 4e to extract the real world size of the equipment with the same manner in the body segment length extraction at step 4.

At step 6e, the processor 102 generates a model of the equipment based on the equipment segment length determined at step 5e.

At step 7e, the processor 102 may also add the model of the equipment to the catalogue of the equipment size in database 106 for use in equipment selection in step 10, as described above.

Figure 3:
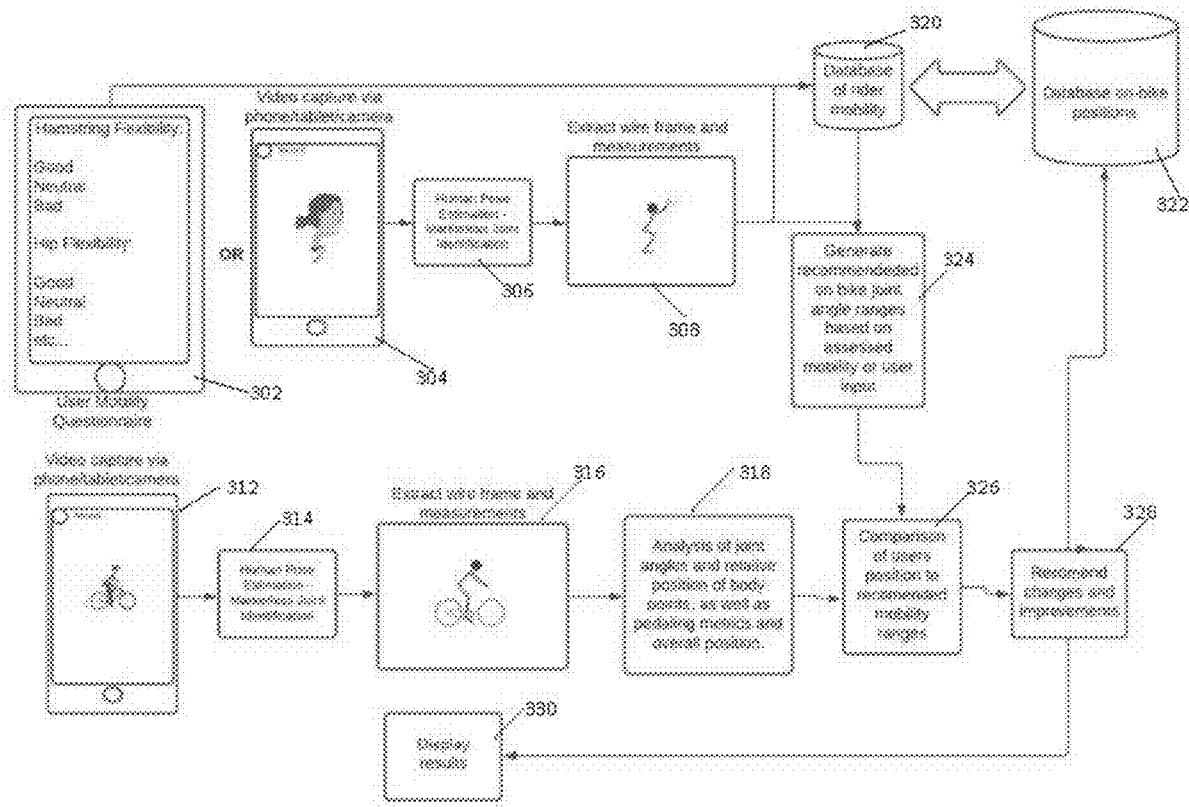
FIG. 3 illustrates a further exemplary process for measuring the proper fit of a sport equipment for a user and suggesting adjustment recommendations.

FIG. 3 illustrates is another example of selecting sporting equipment using method 200 described above. At 302, the processor 102 may send a user mobility questionnaire to the communication device 118. The questionnaire for example may include hamstring flexibility, hip flexibility, etc. for the user to self-evaluate as good, neutral, bad, etc. The communication device 118 may send the answers to the processor 102 and save the answers in the database 106 for rider mobility at 320. The database 106 at 320 may communicate with the database on bike position at 322. Alternatively, as described in step 1 above, at 304 to select skiing equipment, for example, or at 312 to select a biking equipment, the user may take videos or images by the camera 103 of the communication device 118 and send video data or image data to the processor 102 for processing. At 306 and 314, the processor 102 may estimate pose of the user, as described in step 2 above, to identify markerless joints of the user.

At 308, the processor 102 is configured to extract the body segment lengths from the user. At 318, the processor 102 may analyze the joint angles and relative position of body points of the user and overall position based on the wire frame and measurement of the user extracted from 316. At 316 and 318, the processor 102 is configured to measure and report the actual joint angles the user would experience using a piece of equipment at a specified size.

At 324, the processor 102 may generate recommended on bike joint angle ranges based on the assessed mobility from database 106 at 320, and extract wire frame and measurements at 308.

At 326, the processor 102 is configured to compare of the user's position to recommended mobility ranges from 324. If the compared results is greater a threshold, the processor 102 may recommend changes and improvements of the equipment at 328. The recommend changes and improvements may be displayed on the screen of the communication device 118 at 330, and saved to the database of on-bike positions at 322.

Figure 4:
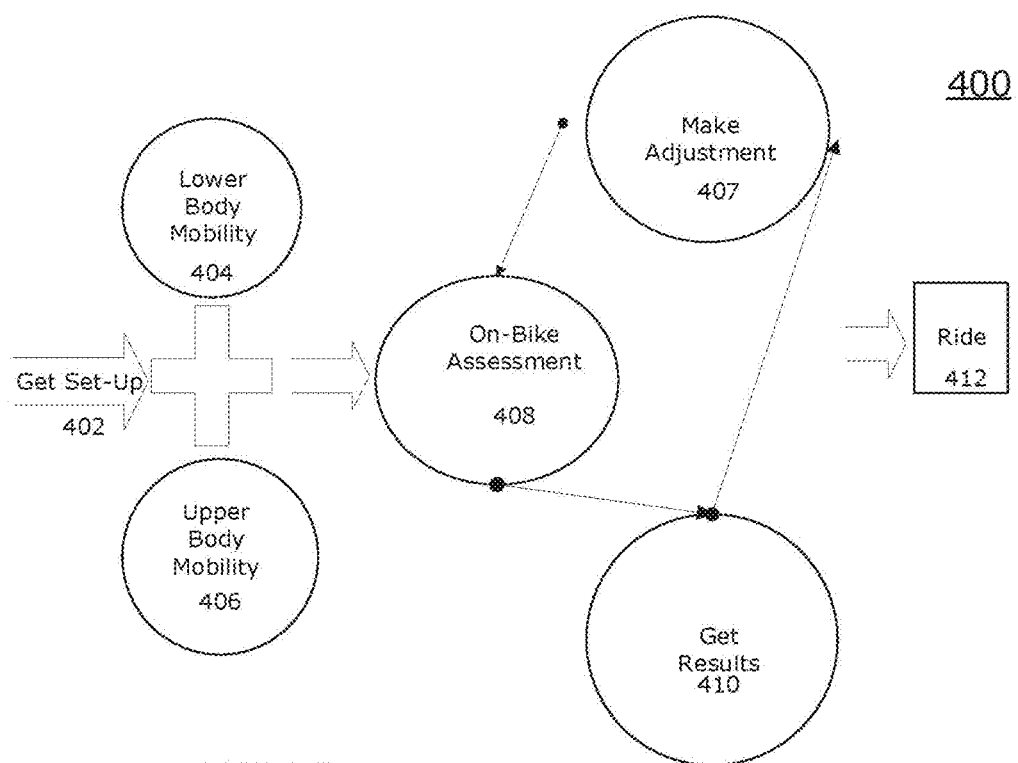
FIG. 4 illustrates a user experience using the method of FIG. 2 for measuring the proper fit of a sporting equipment for the user.

In the example of FIG. 4, a sporting equipment fit process 400 using method 200 is illustrated. A user may set up an application at 402 in the communication device 118 so that the user can use method 200 to select a sporting equipment. The user may provide lower body mobility 404 and upper body mobility 406 to the processor 102 via the communication device 118. The processor 102 may make adjustment of the upper and lower body mobility of the user at 406 and make on-bike assessment at 408. The processor 102 may send the assessment results to the user on the communication device 118. The user may accept the assessment and select a bike and ride the bike at 412. Steps 406, 408 and 410 are iterative for a sporting equipment that fits the user is selected. In step 408, the user is assessed with or on the equipment (for example, on a bike). Adjustments are made in step 407 to the equipment until the optimal position from 200 is determined.

The present disclosure provides certain example algorithms and calculations for implementing examples of the disclosed methods and operations. However, the present disclosure is not bound by any particular algorithm or calculation. Although the present disclosure describes methods and processes with steps in a certain order, one or more steps of the methods and processes may be omitted or altered as appropriate. One or more steps may take place in an order other than that in which they are described, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions, and alterations can be made herein without departing from the invention as defined by the appended claims.

Moreover, the scope of the present application is not intended to be limited to the particular embodiments of the process, machine, manufacture, composition of matter, means, methods, or steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for selecting a sporting equipment, comprising:
    receiving, at a processor, from a camera video or image data of a user comprising a series of movements of the user;
    detecting, at the processor, coordinates of a plurality of joints of the user from the video or image data;
    generating, at the processor, a model of the user comprising body segments lengths of the user respecting relative proportions of the user;
    generating, at the processor, calibrated body segments lengths of the user using a calibration factor;
    assessing, at the processor, mobility of the user based on the video or image data;
    generating, at the processor, a calibrated model of the user using the calibrated segments lengths;
    selecting, at the processor, the sporting equipment based on the model from one or more models of sporting equipment; and
    wherein the calibration factor is chosen from the group consisting of: (1) a calibration factor that is equal to (leg pixel+back pixel+upper arm pixel)/height of the user in centimeter and (2) a calibration factor that is equal to a diagonal measured in camera pixels/diagonal of a marker measured in centimeter using the marker.

2. The method of claim 1 further comprising the step of setting, at the processor, coordinates of the plurality of joints.

3. The method of claim 1 further comprising the step of generating, at the processor, the one or more models of sporting equipment.

4. The method of claim 3, wherein the calibrated body segments lengths are generated by dividing a dimension of a segment extracted from video or image pixels by the calibration factor.

5. The method of claim 1 further comprising the step of performing, at the processor, a mobility assessment of the user.

6. The method of claim 1, wherein the calibrated model is a 2-dimensional stick figure or a 3-dimensional model.

7. The method of claim 5 further comprising the step of modifying, at the processor, the mobility assessment and determine an optimal body position for the sporting equipment.

8. The method of claim 1, wherein the step of selecting the sporting equipment comprises selecting equipment sizes compatible with the user's body shape, mobility and desired riding style.

9. The method of claim 1 further comprising the step of displaying, by the processor, a resulting fit of the sporting equipment.

10. A system for selecting a sporting equipment, comprising:
    a processor configured for:
        receiving, at a processor, from a camera video or image data of a user comprising a series of movements of the user;
        detecting, at the processor, coordinates of a plurality of joints of the user from the video or image data;
        generating, at the processor, a model of the user comprising body segments lengths of the user respecting relative proportions of the user;
        generating, at the processor, calibrated body segments lengths of the user using a calibration factor;
        assessing, at the processor, mobility of the user based on the video or image data;
        generating, at the processor, a calibrated model of the user using the calibrated segment length;
        selecting, at the processor, the sporting equipment based on the model from one or more models of sporting equipment; and
        wherein the calibration factor is chosen from the group consisting of: (1) a calibration factor that is equal to (leg pixel+back pixel+upper arm pixel)/height of the user in centimeter and (2) a calibration factor that is equal to a diagonal measured in camera pixels/diagonal of a marker measured in centimeter using the marker.

11. The system of claim 10, wherein the processor is further configured for setting, at the processor, coordinates of the plurality of joints.

12. The system of claim 10, wherein the processor is further configured for generating, at the processor, the one or more models of sporting equipment.

13. The system of claim 10, wherein the calibrated body segment length is generated by dividing a dimension of a segment extracted from video or image pixels by the calibration factor.

14. The system of claim 10, wherein the processor is further configured for performing, at the processor, a mobility assessment of the user.

15. The system of claim 10, wherein the calibrated model is a 2-dimensional stick figure or a 3-dimensional model.

16. The system of claim 14, wherein the processor is further configured for modifying, at the processor, the mobility assessment and determine an optimal body position for the sporting equipment.

17. A method for selecting a sporting equipment, comprising:
    receiving, at a processor, from a camera video or image data of a user comprising a series of movements of the user;
    detecting, at the processor, coordinates of a plurality of joints of the user from the video or image data;
    generating, at the processor, a model of the user comprising body segments lengths of the user respecting relative proportions of the user;
    generating, at the processor, calibrated body segments lengths of the user using a calibration factor;
    assessing, at the processor, mobility of the user based on the video or image data;

generating, at the processor, a calibrated model of the user using the calibrated segments lengths;

selecting, at the processor, the sporting equipment based on the model from one or more models of sporting equipment;

generating, at the processor, the one or more models of sporting equipment; and wherein the calibrated body segments lengths are generated by dividing a dimension of a segment extracted from video or image pixels by the calibration factor.

18. The method of claim 17, wherein the calibration factor is chosen from the group consisting of: (1) a calibration factor that is equal to (leg_pixel+back_pixel+upper_arm_pixel)/height of the user in centimeter and (2) a calibration factor that is equal to a diagonal measured in camera pixels/diagonal of a marker measured in centimeter using the marker.

* * * * *